United States Patent
Meyer et al.

(10) Patent No.: US 9,467,207 B2
(45) Date of Patent: Oct. 11, 2016

(54) SYSTEM FOR TRANSFERRING ELECTRICAL ENERGY

(71) Applicant: U.S. Army Research Laboratory, Washington, DC (US)

(72) Inventors: Christopher D. Meyer, Bethesda, MD (US); Brian C. Morgan, Ellicott City, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 459 days.

(21) Appl. No.: 14/024,785

(22) Filed: Sep. 12, 2013

(65) Prior Publication Data

US 2015/0069847 A1    Mar. 12, 2015

(51) Int. Cl.
H02J 1/00 (2006.01)
H02J 3/00 (2006.01)
H04B 5/00 (2006.01)
H02J 5/00 (2016.01)

(52) U.S. Cl.
CPC ............. H04B 5/0037 (2013.01); H02J 5/00 (2013.01)

(58) Field of Classification Search
CPC .......... H02J 5/005; H02J 7/025; H02J 17/00; H02J 5/00; H02J 7/0044; H02J 1/02; H02J 2007/0096; H02J 7/0027; H02J 7/0042; H02J 7/04; H02J 7/00; H02J 7/0004; H02J 7/0029; H02J 7/0052; H02J 7/008
USPC ........................................................ 307/104
See application file for complete search history.

(56) References Cited

U.S. PATENT DOCUMENTS

| | | | |
|---|---|---|---|
| 3,387,606 A | 6/1968 | Crafts et al. | |
| 4,030,058 A | 6/1977 | Riffe et al. | |
| 4,048,605 A | 9/1977 | McCollum | |
| 5,216,402 A | 6/1993 | Carosa | |
| 7,872,557 B2 | 1/2011 | Seibert | |
| 8,912,687 B2 * | 12/2014 | Kesler | B60L 11/182 307/10.1 |
| 8,945,328 B2 * | 2/2015 | Longinotti-Buitoni | A61B 5/0002 156/234 |
| 2011/0058705 A1 * | 3/2011 | Lee | A41D 1/005 381/388 |
| 2012/0153737 A1 * | 6/2012 | Karalis | B60L 3/0069 307/104 |
| 2015/0008757 A1 * | 1/2015 | Scholz | H02J 5/005 307/104 |

OTHER PUBLICATIONS

Katherine Boehret, "It's Hard to Cut the Charging Cords," The Wall Street Journal, The Digital Solution, Feb. 16, 2011. Available online at: http://online.wsj.com/article/SB10001424052748704409004576146341266125026.html.

\* cited by examiner

*Primary Examiner* — Jared Fureman
*Assistant Examiner* — Esayas Yeshaw
(74) *Attorney, Agent, or Firm* — Eric B. Compton

(57) ABSTRACT

A system for transferring electrical power, data or both, by way of magnetic induction between a first article and a second article. A first electrically conductive coil is integrated in the first article and a second electrically conductive coil is integrated to a second article. A fastener comprising ferromagnetic or ferrimagnetic material is configured to be positioned through the first coil and the second coil to provide an efficient magnetic conductance path between the first coil and the second coil and to removably secure the first article and the second article together. A control circuit selectively energizes the first coil or second coil with alternating current to transfer electrical energy to the other of said first and second coil.

20 Claims, 4 Drawing Sheets

SYSTEM FOR TRANSFERRING ELECTRICAL ENERGY

GOVERNMENT INTEREST

The invention described herein may be manufactured, used, and licensed by or for the United States Government.

BACKGROUND OF THE INVENTION

I. Field of the Invention

The present invention relates to a system for sharing electrical power between two discrete articles and, in one particular embodiment, a system for transferring electrical power by inductive magnetic coupling between an article of clothing and an electrically powered device in which a high-magnetic-permeability material is directly integrated into a fastening mechanism to increase the magnetic coupling and to improve the power transfer between the articles.

II. Description of Related Art

In many applications, such as military applications, it is necessary to transfer electrical power from one discrete article and to another. For example, self-contained electrical energy storage devices and electrically powered devices may be separately attached to an article of clothing worn by a soldier.

In many cases, it is necessary to transfer electrical energy from a self-contained electrical energy storage device to an electrically powered device, such as a flashlight, radio, and/or the like. For example, the electrical storage device or battery contained within the electrically powered device may become depleted during use. In order to recharge the electrical storage device contained within the electrically powered device, it has been traditionally necessary for the soldier to physically and electrically connect the device to a self-contained electrical energy storage device.

In order to connect the electrically powered device to the self-contained electrical energy storage device, it has been previously necessary to route a cable through an article of clothing and to physically plug cable connectors into both the self-contained electrical energy storage device and the electrically powered device. Such a procedure, however, is oftentimes impractical or simply too time consuming. In other cases, the fasteners or cables may become lost or damaged.

SUMMARY OF THE PRESENT INVENTION

The present invention provides a system for transferring electrical power, data, or both, by way of magnetic induction between a first article and a second article which overcomes the above mentioned disadvantages of the previously known devices.

In brief, a first electrically conductive coil is integrated into the first article, such as an article of clothing. This first coil may be connectable to an electrical energy storage or providing device, like a battery.

Similarly, a second electrically conductive coil is integrated to the second article, such as an electrically powered device. This second coil may also be connectable to an electrical energy storage or providing device.

The system further includes a fastener comprising ferromagnetic or ferrimagnetic material. The fastener is configured to be positioned through the first coil and the second coil to provide an efficient magnetic conductance path between the first coil and the second coil and to removably secure the first article and the second article together.

An electrical control circuit energizes one of the first and second coils with an alternating current flow. The alternating flow of electrical current through the coil results in an alternating magnetic field that is particularly concentrated in the center of the coil. The alternating magnetic field causes an alternating magnetization of the ferromagnetic or ferrimagnetic material of the fastener. The alternating magnetization of the fastener, in turn, induces a voltage in the second coil. An electrical control circuit may be connected to the first coil or second coil then, through a rectifier circuit.

The transfer of electrical energy or data may be in either direction, i.e. from the electrical system associated with the first article and to the second article, or vice versa. Furthermore, the fastener used to transfer the alternating magnetic field from one coil and to the other may also serve to removably secure the second article to the first article.

BRIEF DESCRIPTION OF THE DRAWINGS

A better understanding of the present invention will be had upon reference to the following detailed description when read in conjunction with the accompanying drawing wherein like reference characters refer to like parts throughout the several views, and in which.

DETAILED DESCRIPTION

Figure 1:
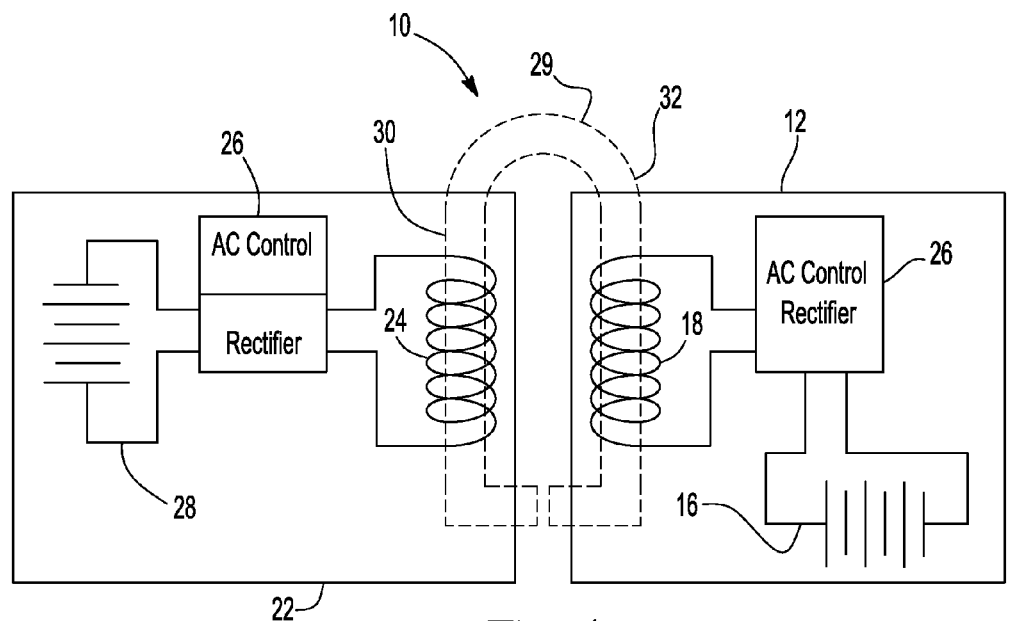
FIG. 1 is a block diagrammatic view illustrating an embodiment of the present invention.

With reference first to FIG. 1, a block diagrammatic view of one energy transfer system 10 according to the present invention is shown. The system 10 includes a first article, such as an article of clothing 12, for instance. The article of clothing 12 may be formed of conventional fabric and textile materials, such as cotton, wool, linen, silk, synthetic fabric materials (e.g., nylon and polyester), blends thereof, or the like. In various embodiments, the article of clothing 12 may be a shirt, pants, shorts, sweater, coat, jacket, vest, helmet, hat, sock, boot, shoe, belt, etc., which are worn by a person. For instance, articles of clothing may be fatigues or military-type wear/combat-type clothing, such as the Army Combat Uniform (ACU), Navy Working Uniform (NWU), Airman Battle Uniform (AMU), Marine Corps Combat Utility Uniform (MCCUU), Coast Guard Operational Dress Uniform (ODU), older style military Battle Dress Uniforms (BDU) or the like. Clothing may also be uniforms and other dress for civilians and first responders, such as typically worn by police, fire fighters, emergency medical technicians (EMT), doctors, paramedics, construction workmen, postal workers, for instance. And clothing may also be recreational wear, such as that typically used for camping, hiking, hunting and fishing, boating, bicycle riding, motorcycle riding, horseback riding, skiing, etc. While the aforementioned articles concern clothing, it will be appreciated that in other embodiments, other articles may be provided, such as a backpack, knapsack, rucksack, harness, etc., which can be carried by a person, and/or otherwise provided.

An electrical energy storage or providing device, such as a battery 16, may be integrated into the article of clothing 12 to power the electrical systems. The energy storage or providing device may be a chargeable capacitor, photovoltaic cell, or a fuel cell, in some embodiments.

Figure 2:
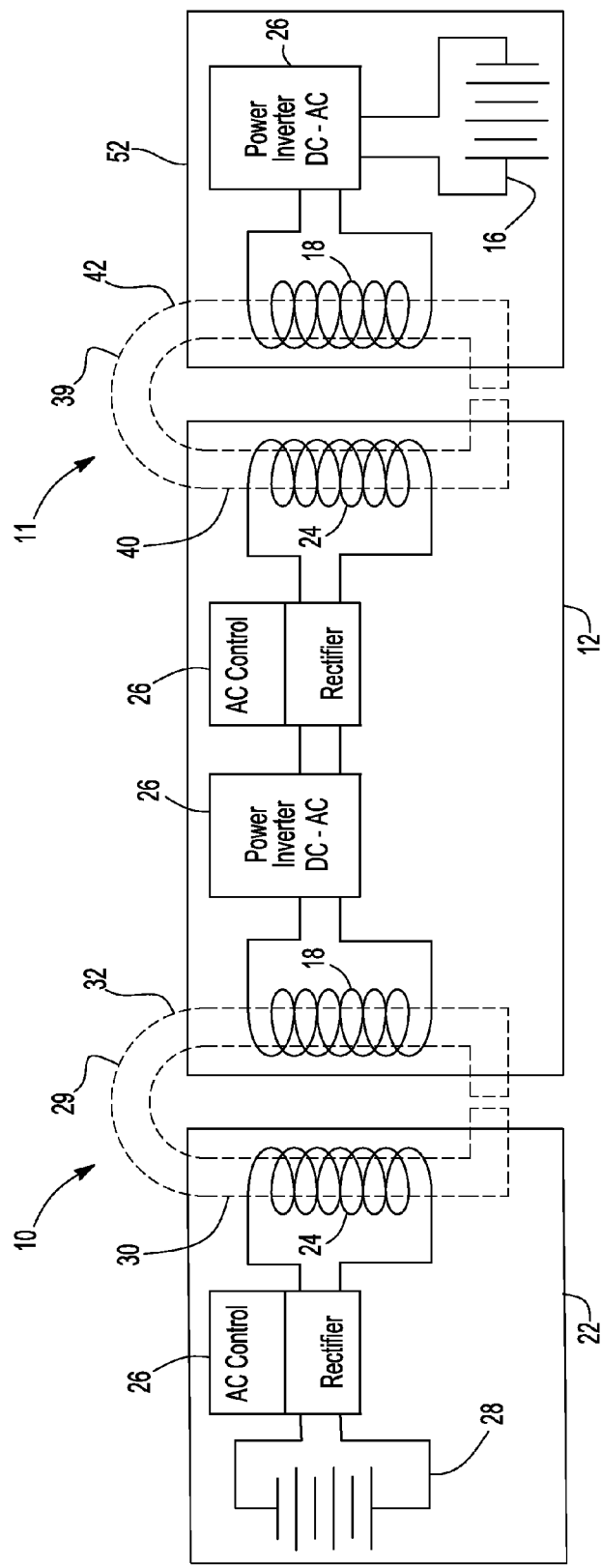
FIG. 2 is a block diagrammatic view illustrating multiple instances of the embodiment of FIG. 1 used within a system.

With reference to FIG. 2, the battery 16 may be alternatively integrated into a third article 52, which is fastened to the article of clothing 12 using a second fastener 39 to also transfer energy from the battery 16 in article 52 to the article of clothing 12.

Figure 6:
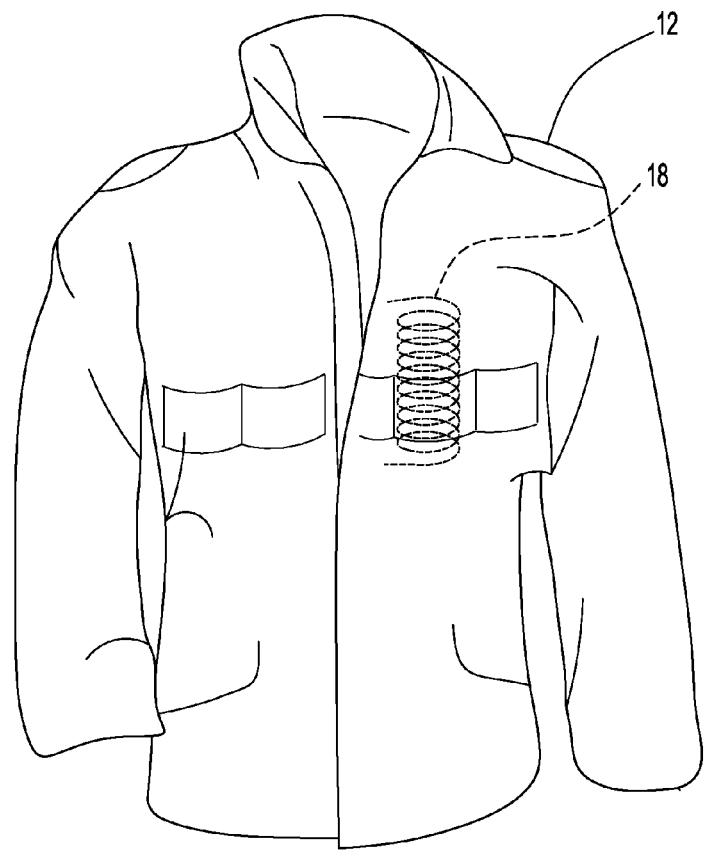
FIG. 6 is a view of an article of clothing used in conjunction with the system of the present invention and with a portion expanded.

With reference now to FIGS. 1 and 6, a first coil 18 constructed of an electrically conductive material is integrated into the article of clothing 12. For example, as illustrated in FIG. 6, the coil 18 may be formed of wire that is integrally woven into the article of clothing 12.

The first coil 18 is connected through an alternating current control/rectifier circuit 20 to the battery 16. In a first mode of operation in which the article of clothing 12 is transferring electrical power from the clothing to an external device, the circuit 20 operates as an alternating current control and produces alternating current to the first coil 18 from the power contained within the battery 16. Alternatively, when the electrical system for the article of clothing 12 is receiving electrical power, the circuit 20 operates as a rectifier and rectifies current from the coil 18 for storage in the battery 16, or other energy storage or providing device, such as a capacitor.

Figure 7:
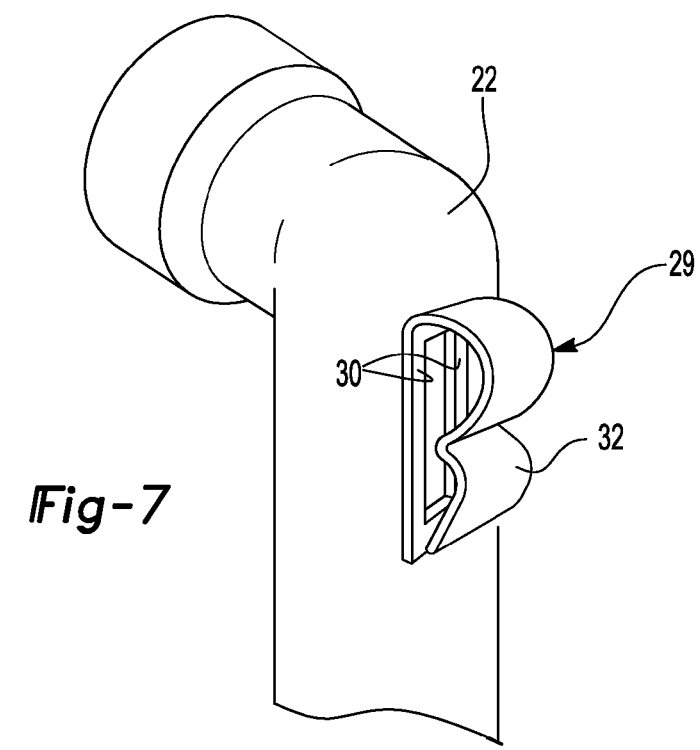
FIG. 7 is an exemplary electrically powered device.

With reference now to FIGS. 1 and 7, the system 10 further includes a second article, such as an electrically powered device 22, which could be a radio, mobile/cellular telephone, personal digital assistant (PDA), computer, signaling device, a global positioning system (GPS) unit, flashlight, etc., for instance. The electrically powered device includes a second coil 24 constructed of an electrically conductive material with could be integrated into electrically powered device 22. This second coil 24 may be connected directly or indirectly through an alternating current control/rectifier circuit 26 to an energy storage or providing device or battery 28. Like the alternating current control/rectifier circuit 20 associated with the article of clothing 12, the alternating current control/rectifier circuit 26 contained in or on the electrically powered device 22 also operates in two modes. In one mode, the alternating current control provides alternating current to the second coil 24 from electrical power stored in the battery 28 during transfer of power from the electrically powered device 22 and to the article of clothing 12. Conversely, when the electrically powered device 22 receives electrical power from the electrical system of the article of clothing 12, the circuit 26 operates as a rectifier to rectify the alternating current induced in the second coil 24 for subsequent storage in the battery 28.

In addition to transferring electrical power, data may additionally or alternatively be transferred in a similar manner over the same coils. For example, audio data or computer data may be transferred in this manner.

Figure 8:
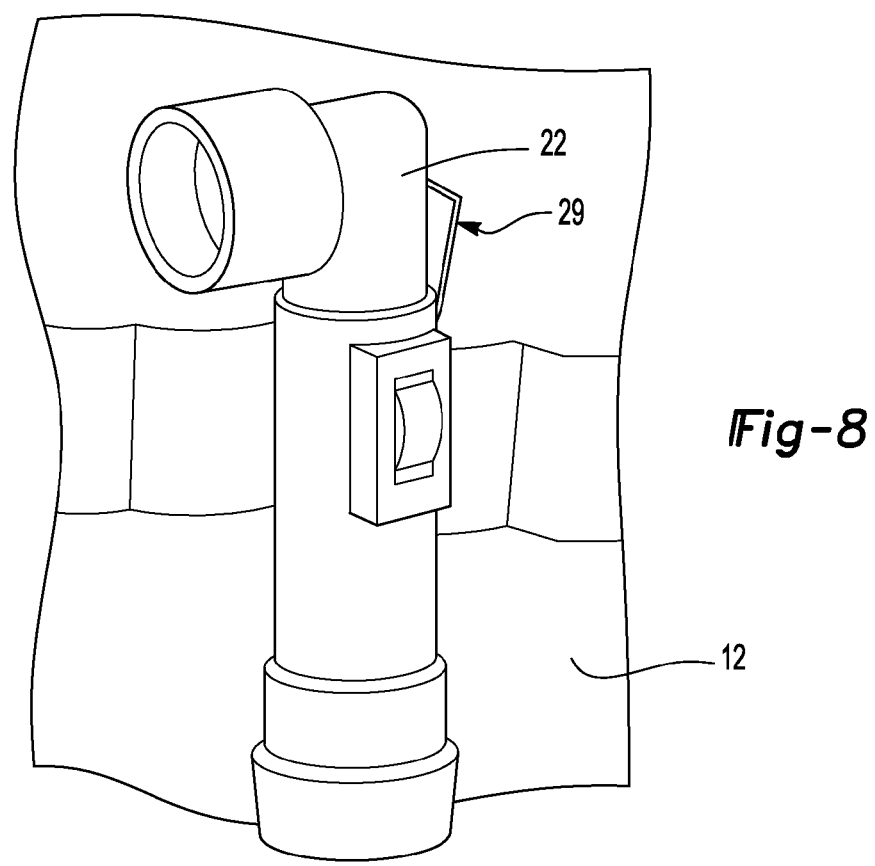
FIG. 8 is a view illustrating the electrically powered device electrically connected to the article of clothing in preparation for a transfer of electrical energy.

With reference now to FIGS. 1, 7, and 8, in order to efficiently transfer power or data between the article of clothing 12 and the electrically powered device 22, a fastener 29 constructed of a high permeability, ferromagnetic or ferrimagnetic material is attached to the electrically powered device 22. The fastener 29 may be constructed entirely or at least partially from ferromagnetic or ferrimagnetic material, such as iron or ferrite, for providing an efficient magnetic conductance path between the first coil 18 and the second coil 24. In some instances, the central portion of the fastener may be fabricated from such material in the form of a generally rigid or solid core, and in the case of a flexible fastener like a strap, it may be formed of a flexible foil of ferromagnetic or ferrimagnetic material.

Figure 4:
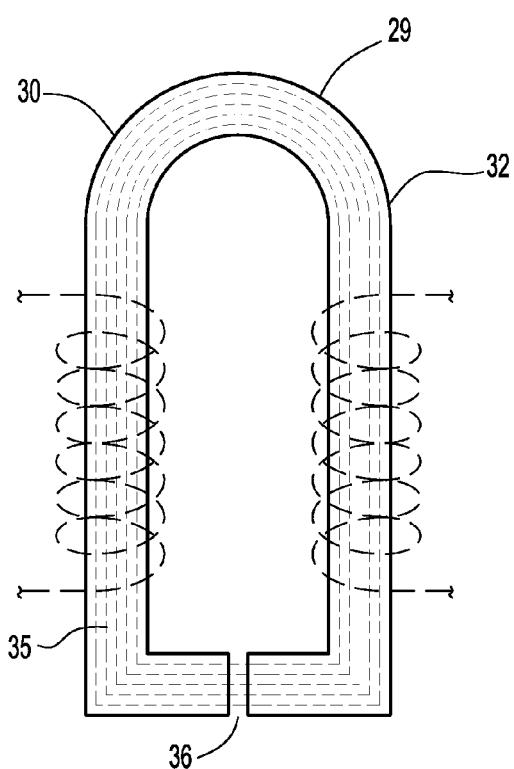
FIG. 4 is a diagrammatic view illustrating the magnetic field lines associated with an embodiment of the present invention.

In addition, the fastener 29 is configured to removably secure the first and second articles together. In some embodiments, as shown, the fastener 29 may be configured as a clip which is generally U-shaped and includes two legs 30 and 32 which abut against each other at their free ends. The leg 30 on the fastener 29 is positioned through the second coil 24 on the electrically powered device 22. When the fastener 29 is coupled to the article of clothing 12 as shown in FIG. 4, the second leg 32 of the fastener 29 extends through the first coil 18 woven into the article of clothing 12. For example, the fastener 29 may be hooked onto an attachment portion, such as a pocket, gusset, pleat, webbing or the like, formed on the article of clothing 12 in the vicinity of the first coil 18. In some embodiments, the attachment portion may include webbing having one or more loops configured for use with Modular Lightweight Load-carrying Equipment (MOLLE), Pouch Attachment Ladder System (PALS), and All-Purpose Lightweight Individual Carrying Equipment (ALICE) typically used by the military. Webbing loops of this kind may be stitched or otherwise attached to the surface of the article of clothing 12; they may be elastic in nature.

FIG. 6 shows the first coil 18 positioned in the vicinity of one of the loops of webbing provided on the article of clothing 12, such as the first coil 18 integrated at least partially into one or more webbing loops. More particularly, the coil 18 may be woven into both the loop and fabric of the article of clothing behind the loop, for instance. Given the wire structure of the coil 18 and the elastic nature of the loop, the coil 18 may be able to flex or deform to some degree.

In doing so, the fastener 29 not only serves to attach the electrically powered device 22 to the article of clothing 12, but also serves as an efficient magnetic conductance path between the first coil 18 and second coil 24. Thus, an alternating current in one of the first or second coils effectively induces an alternating current in the other coil. The fastener 29 enables the device 22 to be readily removed from the article of clothing 12, for instance, by sliding the device 22 upwards. Alternatively, in other orientations, the fastener 29 might be slid downward, sideways, or in some other direction. It may be designed to have a degree of resilience to better engage the fabric of the clothing. For example, in some embodiments, the fastener 29 may be a clip or a strap. Such fasteners can readily and removable couple to an attachment portion on an article of clothing, with the clip or strap passing through an attachment portion, e.g., webbing, formed on the article of clothing 12. Additional fasteners, such as hook-and-loop type fastener (e.g., Velcro®), buttons, snaps or the like, may further my provided on either a clip or strap for a more secure connection, if needed. FIG. 8 shows the clip fastener 29 being slipped over and through a loop of the webbing formed on the article of clothing 12.

With reference to FIG. 4, the U-shape of the fastener 29 may be advantageous so that the magnetic field strength, illustrated by field lines 35, is concentrated within the fastener. The air gap 36 separates the core to allow leg 32 to be inserted through coil 18. After insertion, the gap 36 closes partially or fully for maximum magnetic field containment.

Figure 3:
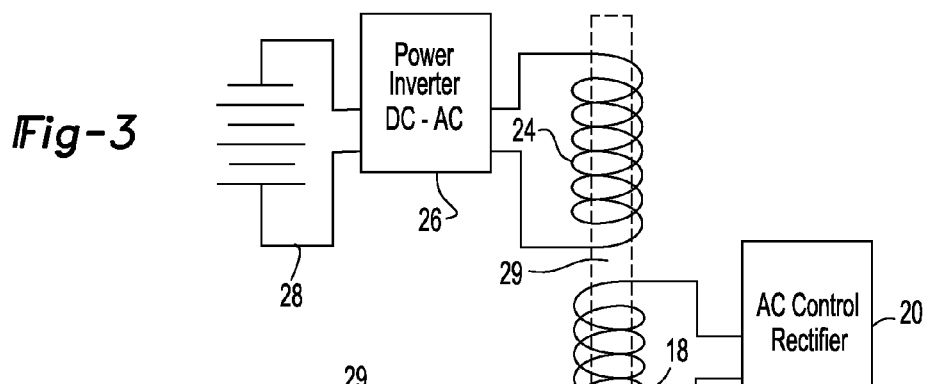
FIG. 3 is a block diagrammatic view illustrating an alternative embodiment of the present invention.

With reference to FIG. 3, the magnetic fastener 29 may alternatively be substantially flat in shape. In this case, the single leg of the fastener 29 is inserted through both coil 18 and coil 24.

Figure 5:
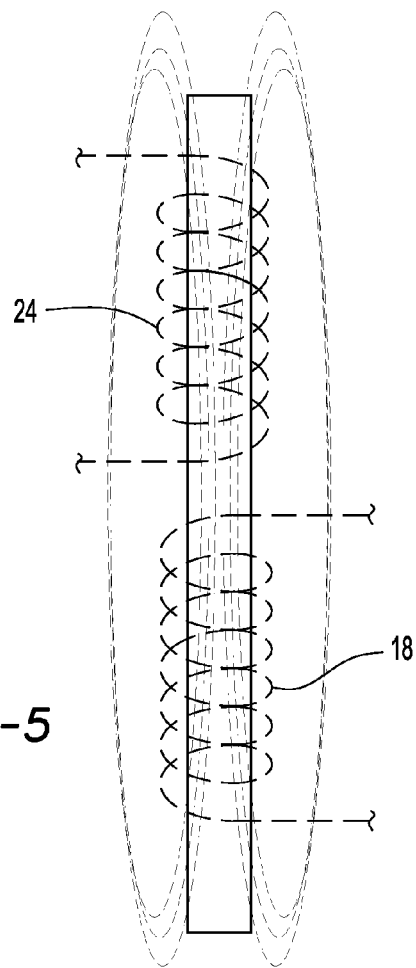
FIG. 5 is a diagrammatic view illustrating the magnetic field lines associated with the alternative embodiment of the present invention.

With reference to FIG. 5, the alternative flat shape of the fastener directs the magnetic field from the transmitting coil 18 through the receiving coil 24, but the field line closes back through the open environment.

From the foregoing, it can be seen that the present invention provides a simple, yet effective, system for transferring electrical power, data, or both between an electrical system contained within an article of clothing and a separate electrically powered device. Furthermore, in some embodiments of the invention, the system selectively transfers electrical energy and/or data from the electrical system contained in the article of clothing and to the discrete electrically powered device, or vice versa. However, it may be desired that the electrical transfer be conducted in a single direction. For example, it may only be desired to transfer power or data from the electrical system integrated with the article of clothing 12 and to the electrically powered device 22, but not vice versa. In this case, it would not be necessary to have an alternating current control circuit in the electrically powered device 22.

Embodiments of the present invention may also provide a safety mechanism for operation of the electrically powered device 22. For example, if and when the fastener 29 becomes removed from the article of clothing 12, whether intentionally or unintentionally, power and/or data transfer will become immediately interrupted between the article of clothing and the electrically powered device 22.

Having described our invention, many modifications will become apparent to those skilled in the art to which it pertains without deviation from the spirit of the invention as defined by the scope of the appended claims.

We claim:

1. A system for transferring electrical power, data or both, by way of magnetic induction between two separable articles, comprising:
a first electrically conductive coil integrated into the first article, said first coil connectible to electrical components integrated within the first article,
a second electrically conductive coil integrated into the second article, said second coil connectible to electrical components integrated within the second article,
a fastener comprising a clip formed of ferromagnetic or ferrimagnetic material and having two legs which are configured to be positioned through said first coil and through said second coil, respectively, to provide an efficient magnetic conductance path between the first coil and the second coil and to detachably secure the first and second articles together, and
a control circuit which selectively energizes said first coil or said second coil with alternating current.

2. The system as defined in claim 1, wherein said fastener is permanently attached to one of the first and second articles.

3. The system as defined in claim 1, wherein said fastener is constructed at least partially of a material of high magnetic permeability.

4. The system as defined in claim 1, wherein said first article is an article of clothing.

5. The system as defined in claim 4, wherein the control circuit is attached to the article of clothing.

6. The system as defined in claim 4, wherein the article of clothing comprises a separate attachment portion which the fastener is configured to be removably secured to.

7. The system as defined in claim 6, wherein the attachment portion comprises a pocket, gusset, pleat, or webbing.

8. The system as defined in claim 7, wherein the attachment portion is webbing comprising one or more loops, the first coil is integrated at least partially into a loop thereof, and the fastener is configured to slip through said loop.

9. The system as defined in claim 1, wherein a rectifier circuit is connected to said second coil.

10. The system as defined in claim 1, wherein said clip is generally U-shaped and the two legs abut at the ends of the generally U-shape fastener.

11. The system as defined in claim 1, wherein the second article is an electrically powered device.

12. The system as defined in claim 1, wherein the first coil, and/or the second coil is connected to an electrical energy storage or providing device.

13. An article for transferring electrical power, data or both, by way of magnetic induction to and/or from another, separable article, comprising:
an electrically conductive coil integrated into the article, said coil connectible to electrical components integrated within the article, said coil configured to transfer electrical power, data, or both to and/or from an electrically conductive coil integrated into another, separable article, and
a fastener comprising a clip formed of ferromagnetic or ferrimagnetic material and having two legs, wherein one leg is configured to be positioned through said coil in the article, and the other leg is configured to be positioned through said coil in the another separable article to provide an efficient magnetic conductance path between the coil in the article and the coil in the another separable article and to detachably secure the article and the another, separable article together.

14. The article as defined in claim 13, further comprising: a control circuit which selectively energizes said coil in the article or said coil in the another separable article with alternating current.

15. The article as defined in claim 13, wherein the article is an article of clothing comprises a separate attachment portion which the fastener is configured to be removably secured to.

16. The article as defined in claim 15, wherein the attachment portion comprises a pocket, gusset, pleat, or webbing.

17. The article as defined in claim 16, wherein the attachment portion is webbing comprising one or more loops, the conductive coil is integrated at least partially into a loop thereof, and the fastener is configured to slip through said loop.

18. The article as defined in claim 13, wherein the article is an electrically powered article.

19. The article as defined in claim 13, wherein the one leg of said fastener is configured to be removably positioned through said coil in the article to removably secure the article and the another, separable article together, and the other leg of the fastener is configured to remain in said coil in the another separable article.

20. An article for transferring electrical power, data or both, by way of magnetic induction to and/or from another, separable article, comprising:
an electrically conductive coil integrated into the article, said coil connectible to electrical components integrated within the article, said coil configured to transfer electrical power, data, or both to and/or from an electrically conductive coil integrated into another, separable article, and a fastener comprising a strap formed of flexible ferromagnetic or ferrimagnetic material which is configured to be positioned through said coil in the article and said coil in the another separable article to provide an efficient magnetic conductance path between the coil in the article and the coil in the another separable article and to detachably secure the article and the another, separable article together.

* * * * *